United States Patent [19]
Tremblay et al.

[11] 3,718,480
[45] Feb. 27, 1973

[54] PASTA

[75] Inventors: Maurice Robert Tremblay, Bramalea, Ontario; Richard Launt Maurer, Mississauga, Ontario, both of Canada

[73] Assignee: Thomas J. Lipton Limited, Toronto, Ontario, Canada

[22] Filed: Feb. 7, 1972

[21] Appl. No.: 224,252

Related U.S. Application Data

[63] Continuation-in-part of Ser. No. 105,098, Jan. 8, 1971, abandoned, which is a continuation-in-part of Ser. No. 37,350, May 14, 1970, abandoned.

[52] U.S. Cl. .................................................99/85
[51] Int. Cl. .............................................A23l 1/16
[58] Field of Search.........................................99/85

[56] References Cited

OTHER PUBLICATIONS

Hummel, "Macaroni Products," London 1966, pages 189, 191, 262, TS2157 H8 1966.

*Primary Examiner*—Raymond N. Jones
*Assistant Examiner*—James Robert Hoffman
*Attorney*—Roy H. Saffrey

[57] ABSTRACT

Preparation of a wheat flour pasta by preparing a dough, shaping the dough into individual pasta pieces, pre-drying the pieces to a moisture content between 22 and 27 per cent by utilizing warm dry air and then drying the pasta to between 8 and 13 per cent moisture by application of microwave energy. The use of microwave energy materially reduces the overall drying time and produces a pasta with a shortened rehydrating time and less microbiological buildup.

10 Claims, No Drawings

PASTA

This invention relates to the manufacture of wheat flour pasta products such as noodles, spaghetti, etc., and it is a continuation-in-part to application Ser. No. 105,098, filed on Jan. 8, 1971, which in turn was a continuation-in-part to application Ser. No. 37,350, filed May 14, 1970 both of said applications now abandoned.

Good quality pasta is normally produced by making a stiff dough from wheat flour and water, with the optional addition of egg and salt. That dough is mechanically rolled out and cut into the desired shape, or extruded under pressure through dies to give the desired shape. This shaped dough is referred to as "green" pasta, and is then subjected to slow drying under very carefully controlled temperature and relative humidity conditions in long ovens heated by hot air. The drying process normally requires extremely careful control of temperature and humidity, takes a considerable amount of space, and must be done very slowly (6 – 10 hours) in order to produce a product of satisfactory quality. If hastened, a hard "skin" forms over the surface of the individual pasta pieces, and this skin cracks or "checks" during the subsequent drying time. The result is pasta which is fragile and when prepared for consumption in boiling water falls apart and yields a sticky cloudy broth.

A further problem with the present method of making pasta is control of the microbiological contamination in the finished product. The moist warm atmosphere of the driers encourages microbiological growth in the pasta and it is not unusual to lose a batch of pasta because of microbiological build up. A vexing problem is that while the bacteria themselves may be rendered harmless by the heat during the final stages of drying, or by terminal processing steps, heat stable toxins are often produced which cannot be eliminated or rendered harmless.

Dried pasta is cooked by boiling it in water. In the cooking process it takes in water or becomes rehydrated. Even good quality pasta made by the known methods takes a relatively long time to rehydrate, a factor that has limited its use.

Pasta is commonly pre-dried to about 20 percent moisture at a quicker rate than it is finish dried for the purpose of saving time. The commonly used methods of drying is controlled atmosphere, both in the pre-dry and in the finish dry stages. As indicated above, the finish dry stage must be done slowly to avoid "checking" It has been suggested to use the application of microwave energy for the finish dry stage in a publication entitled, "Macaroni Products" by Dr. Ch. Hummel (1966) London: Food Trade Press, Ltd., 7 Garrick Street, London, W. C. 2, but the microwave method has never been successfully used in practice. The reason is that the product tends to case harden if the pre-drying is carried on to the customary 20 percent moisture level.

It has been found that if the pre-drying is carried out to an upper limit of about 22 percent, then one can finish dry with microwave energy to achieve a good product that has improved rehydrating properties and less microbiological build up. Additionally, the processing time is greatly reduced.

With this invention, pasta of an improved quality can be manufactured in a fraction of the time and factory space.

A method of making a wheat flour pasta according to this invention comprises the steps of preparing a dough having a wheat flour base, shaping the dough to form a green pasta and drying the green pasta to achieve a stable dried product firstly by drawing moisture from the pasta into the surrounding atmosphere by controlling the temperature and humidity of the surrounding atmosphere until the moisture content is reduced to between 22 and 27 percent and secondly the application of microwave energy to drive moisture from the pasta. The invention will be clearly understood after reference to the following description.

The first step in making pasta is to make a good quality pasta dough. Pasta doughs consist essentially of wheat flour preferably having a high percentage of Durham wheat and water. Preferably egg yolk is added. A good pasta dough is made by forming a mixture of wheat flour, egg yolk and water. The amount of egg yolk added usually about 5 per cent egg yolk solids calculated on the dry basis. Enough water is added to give to the pasta dough a moisture content of between 26 and 31 percent. The particular recipe for the pasta dough is not critical to the invention.

The dough is then mechanically rolled out or extruded and then cut into the desired pasta shape. The method for doing this is not critical to the invention. A preferred method is to extrude the dough through an extruding head to form it into strips having a square cross section of about 0.040 inches in width. Noodles are a very common form of pasta and they consist essentially of strips having a cross section width of about 0.040 inches, and a length of about one-half inch to 4 feet. Pasta dough so formed to shape is known as "green" pasta. As indicated above, it is customary to stabilize "green" pasta by subjecting it to slow drying under very carefully controlled humidity conditions. The drying process essentially reduces the water content of the pasta, and leaves it in a hardened state, and in a form that can be stored indefinitely.

It has been found that if "green" pasta is first dried in a controlled atmosphere by subjecting it to the flow of warm dry air, to reduce the water content to between 22 and 27 percent, then the remaining moisture can be driven from it by the application of microwave energy to achieve stable dried product.

It has long been known that microwaves of certain wave length are specifically absorbed by water molecules and their energy converted to heat, but the concept has never been applied to the drying of wheat flour pasta, because the heat acting upon the water would cause the pasta to puff and become fragile. The resulting product would have no strength, and an unpleasant appearance when cooked.

The essence of this invention is the discovery that if some of the water is removed from the "green" pasta by controlled atmospheric conditions, then microwave energy can be applied to the pasta to complete the drying process rapidly, without puffing that is objectionable.

It has been found that the moisture content of the "green" pasta should be reduced to at least 27 percent by means of controlled atmosphere, following which the remaining moisture can be removed with the application of microwave energy. It is usual to dehydrate pasta to about 8 to 13 percent as a final moisture content.

Following are examples of pasta noodle production according to the invention. A wheat flour pasta dough was made and formed into green pasta in noodle form having a length of about one-half inch and a cross sectional width of about 0.040 inches as explained above. It was pre-dried to reduce the moisture content to about 22 percent in a standard pre-dryer known as the Buhler Pre-Dryer as made and sold by the Buhler Brothers Engineering Works of Uzuvil, Switzerland. It was then dried in a microwave dryer Model 1-2LC as manufactured and sold by Cryodry Corporation of San Ramon, California to complete the drying of the product and achieve a certain amount of puffing as will be explained later. This particular model has an oven about 34 inches long and a cross section of about 17 inches by 17 inches. It operates at a frequency of about 2,450 megahertz.

With power input to the dryer set at 4.6 kilowatts 75 lbs. of pasta per hour were carried through the oven on a continuous conveyer to reduce the moisture content to about 8 percent. There were thus 60 watt hours of energy supplied per pound of pasta. The rate of feed of the pasta to the oven was such that the pasta had an exposure to the microwave radiation for about 10 – 12 minutes. The resultant dry noodle has a cross sectional dimension of about 0.42 inches by 0.42 inches.

In a further example, green pasta was made as previously indicated except that the length of the pre-cut pieces was 1 inch. It was pre-dried as explained above to reduce the moisture content to about 25 percent. It was then dried in a microwave drying oven Model IV 50 manufactured and sold by Cryodry Corporation to complete the drying to a moisture content of about 9.2 percent.

This dryer has a frequency of about 915 megahertz and a rated output of about 50 kilowatts of microwave power.

The unit has two ovens each 12 feet long and 2 feet by 3 feet in cross section. The product was carried through the oven on a continuous conveyer at a rate that exposed the product to microwave drying for 7¼ minutes. Air was passed through both chambers at a combined rate of 6,000 cubic ft. per minute at a temperature of about 218°F. inlet and 170°F. outlet. There was an energy input of 25 kilowatts per oven. The throughput rate was 750 lbs. per hour per oven (1500 lbs. per hour for the 2 oven unit). This is about 29 watt hours of energy per pound of pasta for a pasta exposure time of about 7¼ minutes. The exit temperature of the pasta was about 140°F. to 180°F. The bacterial count of the product was very low at about 1500 organisms per gram.

The reason for passing hot air through the chamber of the oven in the second example is to carry away the moisture as it was released from the pasta. This materially improved the efficiency of the drying operation and in a commercial unit of any substantial capacity the rate of water release is such that the passage of an air current through the oven to carry it away is necessary.

Other rates of energy input have been used satisfactorily. Good product has been achieved with energy inputs of between 100 watt hours per pound of pasta and 10 watt hours per pound of pasta. It will be apparent that the energy input can be varied for a given exposure time by increasing or decreasing the output of the microwave generator. It will also be apparent that the energy input to the pasta can be varied by varying the time of exposure of the pasta for a given wattage of microwave power.

The microwave portion of the drying cycle has been conducted in a period of time as short as 1 second. This involves a very large wattage and there is a tendency to burn the product. However, it is possible to achieve a drying of the product by the application of microwave in accordance with this invention with exposure time as low as 30 seconds without burning. At these low exposure times, caution must be observed to avoid burning.

At the other end of the scale, one can expose the pasta to a relatively slow drying in the microwave oven. Drying times up to one hour have been found satisfactory. However, at this end of the scale, one runs into the difficulty of pieces of the product setting together as the moisture is driven from the product.

In each of the two specific examples noted above, there was a slight degree of puffing of the product. This varies somewhat with the rate of supply of energy. If the energy is supplied quickly, the puffing tends to be greater. If one dries over a longer period of time, say in the order of one hour, the puffing is minimal or nil. The preferred exposure times for the four energy inputs of between 100 watt hours per pound and 10 watt hours per pound are 4 to 15 minutes. Variations of power input per pound and drying exposure time can be made within the scope of the invention.

When microwave energy is applied to dry the "green" pasta after its moisture content has been reduced, there is some puffing, but it is controlled and it does not materially affect the nature of the finished product in a way that changes its appearance or taste. The controlled puffing that is achieved by microwave energy is in fact an advantage. The heat of the microwave energy achieves at least some gelatinization of the starch of the pasta and leaves it in a somewhat porous form, so that when one comes to cook the dried pasta that has been manufactured in this way, the pasta takes in the water more readily and rehydration time is materially reduced. This gelatinization is distinctive in pasta drying and the resulting porosity or puffing is new in a pasta. This reduction of rehydration time is of itself of a substantial advantage. Pastas, especially in noodle form, are commonly added to dry soup mixes which consist essentially of dehydrated vegetables, fats and pasta. The method of reconstituting these dried soup mixes is to boil them in water and the process is, generally speaking, one of rehydration. Vegetables and meats tend to rehydrate faster than the existing pastas and in cases where pastas are used in these products, the cooking of the pasta materially detains the final preparation of the mix. Pasta prepared according to this invention, wherein the drying of the "green" pasta has in its final stage been achieved with microwave energy, will rehydrate as quickly as the vegetables, so that the rehydration of the pasta need no longer detain the preparation time of the soup mix.

It has been found that the pre-drying of the "green" pasta under controlled atmospheric conditions, should be to achieve a water content of between 22 and 27 percent. If one tends to pre-dry more than 22 percent, the pasta tends to case-harden, and there is not sufficient puffing of the pasta as a result of the subsequent application of microwave energy to achieve a product that will rehydrate quickly. If one permits much more than 27 percent moisture to remain, the subsequent application of microwave energy causes over puffing, with the result that the dried pasta product tends to disintegrate and lack the necessary strength. The preferred moisture content, prior to the application of the microwave energy is 25 percent. With moisture contents of over 27 percent the liberated moisture also tends to be excessive and to cause the small pasta pieces to stick together as they dry.

As indicated above, the final moisture content of a stable product is a matter of preference, moisture contents of between 8 and 13 percent are common. Common practice is to reduce the moisture level of pasta to about 12 percent. At 12 percent or below, the pasta is stable and will not deteriorate over storage periods of weeks or more. The exact moisture level for stability depends somewhat on the composition of the pasta (inclusion of salt) and the environment in which it is to be stored. Lower moisture levels — to an extreme of 2 percent — are occasionally desirable where it is desired to use the pasta as a desiccant in combination with other materials. These things, however, have no bearing on the practice of the invention, which is the pre-drying to a critical range and then the drying by application of microwave energy.

The manufacturing process time, according to this invention, is very much reduced over the prior methods. The initial drying step, wherein the "green" pasta is reduced in moisture content from between 26 to 31 percent to between 22 and 27 percent can be carried out in between 1 and 13 minutes. The subsequent removal of water by the application of microwave energy to achieve the final stable product, can be carried out in between 1 and 10 minutes. Thus, the total process time is between 7 and 28 minutes allowing five minutes for conveyer transport of pasta. This is to be compared between 5 to 10 hours process time with the used methods of the prior art, wherein all of the moisture is removed by controlled atmosphere.

A further advantage of the invention is that the speed affords little or no opportunity for the growth of microorganisms or the production of toxins, and the heat of the microwave energy eliminates the formation of bacteria. With the standard method of producing pasta, the long periods of humid, warm atmosphere tend to cause microbiological contamination of the product.

It is well known that pasta dried entirely by controlled atmosphere under normal commercial conditions has a bacteria count of about $10^6$ organisms per gram. It has been found that the average bacterial count for pasta manufactured by the present method is 1500 organisms per gram and that no counts yet taken have been higher than 10,000 organisms per gram. It will be apparent that the danger of bacterial contamination is very much reduced.

One can, with this invention, manufacture a purer product that will rehydrate more quickly, that is freer of bacteria, in a very much shortened time, and in a much smaller factory space.

I claim:

1. A method of making a wheat flour pasta consisting essentially of the steps of preparing a dough having a wheat flour base, shaping the dough to form "green" pasta and pre-drying the "green" pasta to achieve a stable dried product by utilizing warm dry air to draw moisture from the pasta into the surrounding atmosphere while controlling the temperature and humidity of the surrounding atmosphere until the moisture content is reduced to between 22 and 27 percent and, after the moisture content has been reduced as just aforesaid, then continuously conveying the pasta through a drying zone while applying microwave energy to drive moisture from the pasta until the moisture content is between 8 and 13 percent, the said application of microwave energy being at a rate sufficient to achieve at least some gelatinization of the starch in the pasta, and carrying away moisture as it is being driven from said pasta by said microwave energy by passing a drying gaseous medium over the pasta.

2. A method of making wheat flour pasta as claimed in claim 1, in which said "green" pasta is dried by controlled atmosphere as aforesaid in claim 1, until the moisture content is reduced to about 25 percent.

3. A method of making wheat flour pasta as claimed in claim 2, in which said microwave energy is applied at a rate of between 20 and 40 watts per pound of pasta per hour.

4. A method of making wheat flour pasta as claimed in claim 2 in which said microwave energy is applied at a rate of about 30 watts per pound of pasta per hour.

5. A method of making wheat flour pasta as claimed in claim 2, in which said microwave energy is applied at a rate of between 20 and 60 watts per pound of pasta per hour.

6. A method of making wheat flour pasta as claimed in claim 2 in which said microwave energy is applied at a rate of between 10 to 100 watts per pound of pasta per hour.

7. A method of making wheat flour pasta as claimed in claim 1, in which said microwave energy is applied at a rate of between 10 to 100 watts per pound of pasta per hour.

8. A method of making wheat flour pasta as claimed in claim 1, in which said microwave energy is applied at a rate of between 20 and 60 watts per pound of pasta per hour.

9. A method of making wheat flour pasta as claimed in claim 1, in which said microwave energy is applied at a rate of about 30 watts per pound of pasta per hour.

10. A method of making wheat flour pasta as claimed in claim 1, in which said microwave energy is applied at a rate of between 20 and 40 watts per pound of pasta per hour.

* * * * *